United States Patent
Kapoor et al.

(10) Patent No.: US 11,544,266 B1
(45) Date of Patent: Jan. 3, 2023

(54) METHODS AND SYSTEMS FOR EFFICIENTLY AND RAPIDLY GENERATING HIGHLY CUSTOMIZED CLOUD-BASED ENTERPRISE SOFTWARE APPLICATIONS

(71) Applicant: meZocliq LLC, New York, NY (US)

(72) Inventors: Vikas Kapoor, New York, NY (US); Baskar Duraikannu, Madison, NJ (US); Fang Fang, New York, NY (US); Abhilash Madhavarapu, Nutley, NJ (US); Vijay Tolpadi, Hillsborough, NJ (US); Mahesh Rajamani, East Brunswick, NJ (US); Chao Wang, North Bergen, NJ (US); Hetal Kapadia, Newark, NJ (US); Sushant Kataria, Jersey City, NJ (US); Vineet Mathur, West Caldwell, NJ (US)

(73) Assignee: meZocliq LLC, New York, NY (US)

( * ) Notice: Subject to any disclaimer, the term of this patent is extended or adjusted under 35 U.S.C. 154(b) by 32 days.

(21) Appl. No.: 17/127,165

(22) Filed: Dec. 18, 2020

Related U.S. Application Data (60) Provisional application No. 62/951,834, filed on Dec. 20, 2019.

(51) Int. Cl.
  *G06F 16/2455* (2019.01)
  *G06F 16/248* (2019.01)
  *G06F 16/22* (2019.01)
  *G06F 16/28* (2019.01)

(52) U.S. Cl.
  CPC ...... *G06F 16/24553* (2019.01); *G06F 16/221* (2019.01); *G06F 16/2282* (2019.01); *G06F 16/248* (2019.01); *G06F 16/285* (2019.01)

(58) Field of Classification Search
  CPC ............ G06F 16/24553; G06F 16/221; G06F 16/285; G06F 16/2282; G06F 16/248
  USPC .......................................................... 707/769
  See application file for complete search history.

(56) References Cited

U.S. PATENT DOCUMENTS

| | | | |
|---|---|---|---|
| 9,146,954 B1 * | 9/2015 | Boe ........................ | H04L 43/16 |
| 9,294,361 B1 * | 3/2016 | Choudhary ........... | G06F 3/0484 |
| 10,505,825 B1 * | 12/2019 | Bettaiah ............ | G06F 16/24578 |
| 10,664,570 B1 * | 5/2020 | Clark ..................... | G16H 40/63 |
| 2009/0164833 A1 * | 6/2009 | Sebastian ................ | G06F 16/21 714/2 |
| 2017/0286502 A1 * | 10/2017 | Bar-Or ...................... | G06F 8/34 |
| 2017/0286526 A1 * | 10/2017 | Bar-Or .................. | G06F 16/288 |

* cited by examiner

*Primary Examiner* — Dung K Chau
(74) *Attorney, Agent, or Firm* — Sterne, Kessler, Goldstein & Fox P.L.L.C.

(57) ABSTRACT

Disclosed herein are system, method, and computer-readable device embodiments of a no-code, enterprise application software (EAS) system. The system may include a database configured to store a data model including one or more parties, governors and steps. The database may be further configured to store a plurality of rules in a rules table. The system may also include a rules engine, coupled to the database, where the rules engine is configured to query a rules table utilizing a compound index to locate a rule to execute and execute the rule. Further included in the system may be a query engine coupled to the database for converting user defined queries into database-specific queries and a report engine coupled to the database for generating reports based on the data stored in the database.

20 Claims, 7 Drawing Sheets

| Table 302 | Part 304 | Section 306 | Group 308 | Variable 310 |

METHODS AND SYSTEMS FOR EFFICIENTLY AND RAPIDLY GENERATING HIGHLY CUSTOMIZED CLOUD-BASED ENTERPRISE SOFTWARE APPLICATIONS

CROSS-REFERENCE TO RELATED APPLICATIONS

The present application claims the benefit of U.S. Provisional Patent Application No. 62/951,834, filed Dec. 20, 2019. This application is incorporated herein by reference in its entirety, for all purposes.

BACKGROUND

Enterprise software (also known as enterprise application software, or "EAS"; hereinafter referred to as either "the application", "the software" or "the system"), is software which is used to satisfy the (business) needs of an organization, rather than those of individual users. Typical services provided by enterprise software are business-oriented tools, such as automated billing systems, security, enterprise content management, customer relationship management, enterprise resource planning, business intelligence, project management, and human resource management. Enterprise software can be designed to handle business-specific processes, such as (for example), management of financial assets or insurance policies.

Historically, one of the major obstacles in implementing enterprise software, particularly in a big-data ecosystem, is the degree of customization which may be required before the end-user organization is able to utilize the software (either by experienced developers or by end-users), as well as the costs (in time, money and man-power) involved in such customization. Every organization (and every business process) has different requirements and operating procedures, specific to that organization (or process). Thus, as opposed to software products like word processors or spreadsheets, which are generally utilized "out of the box", enterprise software systems typically involve a high degree of customization to become usable by, and valuable to, a given organization. The need for such customization, of course, contributes significantly to the cost of the EAS and delays the ability of the organization to begin utilizing the EAS (until such customization is completed).

Historically, implementation of this type of enterprise software has been an incredibly involved, expensive and lengthy process, involving multiple phases.

At the other end of the spectrum is a more recent movement towards no-code development platforms (NCDPs). NCDPs ostensibly allow non-programmers to create application software through graphical user interfaces and configuration instead of traditional computer programming, thereby expediting (and decreasing the cost of) the application development process. However, such platforms vary widely in their functionality, integrations and market-niche. Some applications may focus solely on a specific business function (such as data capture or workflow), while others may seek to integrate entire enterprise resource planning tools into a mobile form factor.

Typically, the use of NCDPs (as opposed to fully customized software) replaces one problem with the other. Whereas completely customized code will theoretically perform exactly as needed by the end-user organization, it is expensive to generate, expensive, difficult and time-consuming to install, requires the use of highly skilled developers and requires continued dependence on such programmers even after implementation in order to effect any changes. On the other hand, using an NCDP is significantly less expensive and doesn't depend on skilled developers. However, unless one is using an NCDP specifically tailored to a particular business function, the end-result is unlikely to provide the level of customization and specifically-needed functionality as customized code. Thus, the choice has historically been between: (1) expensive, difficult to install, but highly customized software; or (2) inexpensive, easy to install, but much more generic software.

Another obstacle typically faced by organizations in implementing enterprise software is experienced in switching over to the (new) software system—that is, in connection with data migration (selecting, preparing, extracting and transforming data and transferring it from one system to another) and data integration (processes used to combine data from disparate sources into meaningful and valuable information). Data migration and integration involve moving or synchronizing huge quantities of variable, heterogeneous data which can result from internal legacy systems that have varying data formats. Legacy systems may have been created around older technologies, such flat file, network, or hierarchical databases, unlike newer generations of relational and non-relational databases. Data in different formats from external sources continue to be added to the legacy databases to improve the value of the information. Each generation, product, and home-grown system has unique demands to fulfill, in order to store or extract data.

Other fundamental difficulties typically experienced with enterprise software systems are finding reliable "trusted data" and, having found such trusted data, ensuring the security of that data. Most organizations have a variety of data warehouses, stores and lakes to support their data needs. These work for narrow purposes for short periods. But their trustworthiness and utility are constantly compromised by new systems or changing business requirements. As a result, a simple business request for a robust view of all client relationships can be hard to meet. Moreover, having ensure the proper governance of the data, it is becoming increasingly difficult to protect it from unauthorized access and data corruption throughout its lifecycle.

Once an organization has begun using enterprise software, a further drawback frequently experienced is the need for additional customization (enhancements) over time. For example, the organization may decide to add or modify specific processes, queries or work-flow. Much more likely, the organization may decide it would like to change one or more variable names or add new variables, change one or more variables in a process, but only under certain given business scenarios (e.g., change a variable when a security asset class is equity, but not when it is debt), change the underlying details of one or variables, or enact other similar changes, and this will happen with regularity. Since the skills required to customize the enterprise software are typically not found in employees of the end-user organization, there is a continued reliance on a third-party to effect additional modifications over time. This increases costs, delays implementation, and is overall inefficient.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments described herein.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a no-code enterprise application software system.

Figure 7:
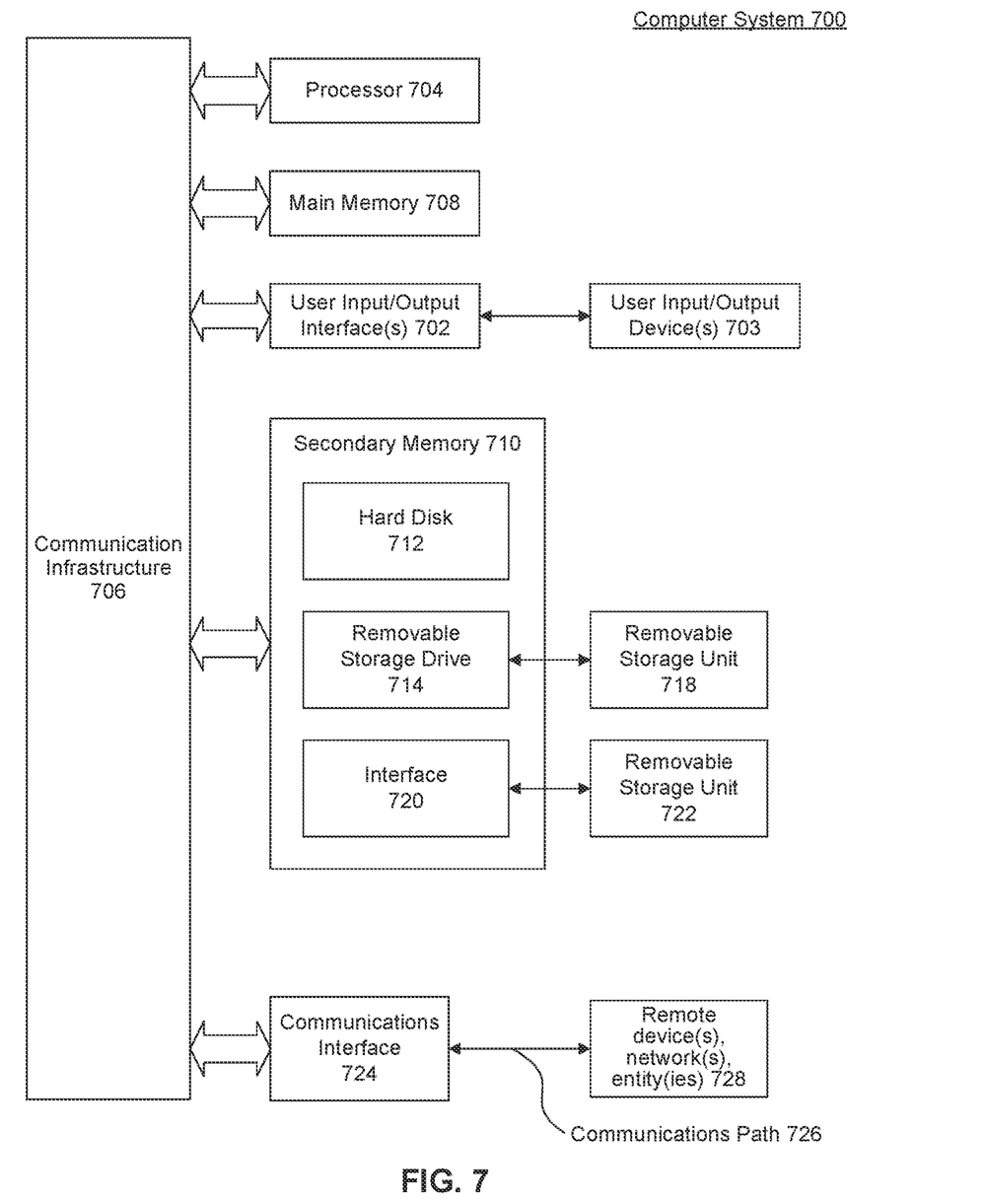
FIG. 7 is a block diagram of an example computer system that may be used to implement embodiments of the present invention.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Example Enterprise Application Software System

Figure 1:
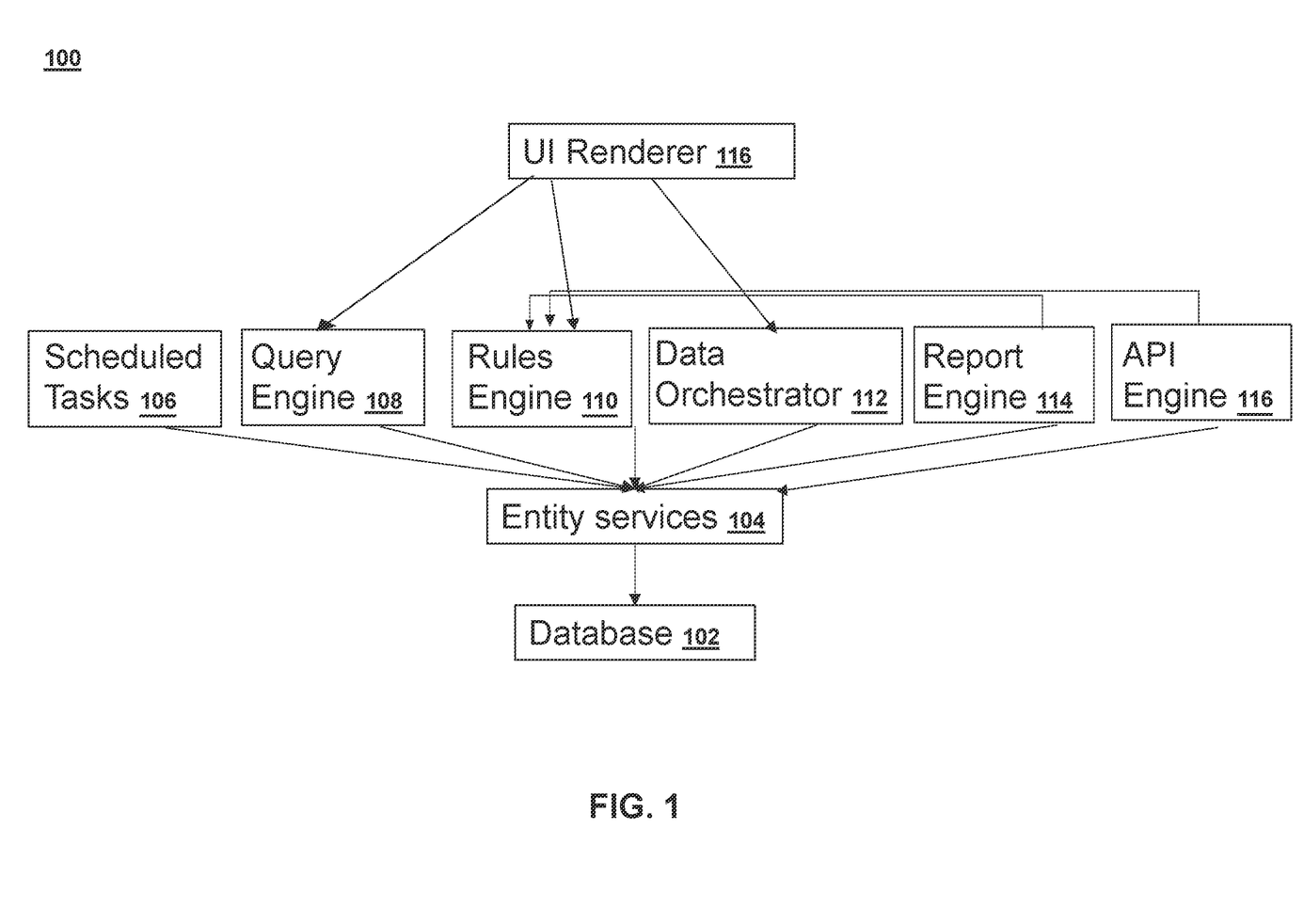
FIG. 1 is a block diagram of a user experience including a launchpad and a suite of client applications, according to some embodiments.

FIG. 1 is a block diagram of a no-code enterprise application system 100, according to embodiments of the present invention.

Enterprise application software system 100 ("EAS 100") may be a system that is used to implement business processes in any context and for any industry. For example, enterprise EAS 100 may be used for tracking investment securities, employee on boarding, hotel room management, or any other process used in a business. Importantly, unlike conventional enterprise applications, EAS 100 may be a no-code system. That is, EAS 100 may be configured without a user entering any programming code whatsoever. This may allow for users that do not have programming experience to still adapt EAS 100 for their needs, which may lower the costs of implementing a system using EAS 100 as well as limit undesired or unexpected results due to incorrect programming.

At a high-level, EAS 100 may include a number of sub-components, such as database 102, entity services 104, scheduled tasks 106, query engine 108, rules engine 110, report engine 112 and UI renderer 116. Components or sub-components may represent processes, routines, co-routines, modules, functions, other equivalent concepts, or any combination thereof.

According to embodiments of the present invention, database 102 may be implemented in multiple different database engines that are utilized depending on the data required to be stored. For example, much of the data of the system may be stored in a non-relational database engine, such as APACHE HBASE. One advantage of a non-relational database is that it allows for extremely efficient searching and data retrieval. However, because it lacks the structure of a relational database, certain more complex queries may be more difficult to execute. However, as explained further below, due to the unique structure of the data model of database 102, EAS 100 may still be able to perform complex queries on a non-relational database. Database 102 may also include a database engine that is highly scalable and fault tolerant, such as APACHE CASSANDRA. And, in some embodiments database 102 may include database engines that are particularly suited for storing and searching binary data, such as CEPH or ELASTICSEARCH. In yet other embodiments, EAS 100 may be configured to store data for analytics in reporting in a database engine such as APACHE HADOOP. EAS 100 is configured to store and query the particular database engine of database 102 based on the particular data being stored or queried. The unique data model of database 102 is discussed further below with reference to FIGS. 2 and 3 below.

Entity services 104 is a middleware layer of EAS 100 that is responsible for providing certain database management and data formatting functions of EAS 100. For example, as noted above certain database engines of database 102 may be non-relational. In such cases, entity services 104 may be configured to overlay relational database functionality on these non-relational databases. As a result, traditional SQL queries may still be executed, even if the database engine of database 102 is non-relational. In addition, to relational overlay functionality; entity services 104 may also provide certain data validation and data formatting functionality. For example, entity service 104 may include functionality that ensures that numbers, currencies, dates, text, are all stored in the database engines of database 102 using the same formatting. This ensures data consistency regardless of the particular database engine being used by database 102.

Scheduled tasks 106 is a sub-component of EAS 100 responsible for managing tasks that occur within EAS 100 on scheduled intervals. Scheduled tasks 106 may be configured to execute data retrieval processes, computation processes, workflow triggering events, report generation (including API calls), or batch processes (with a configurable order) on scheduled intervals, such as every certain number of seconds, minutes, hours, days, or even long. For example, consider the scenario where EAS 100 is configured to manage securities, in such an instance, scheduled tasks 106 may be configured to poll for pricing updates every five minutes or every hour, etc. Scheduled tasks 106 may also be configured to perform certain processes within EAS 100 on a scheduled basis. For example, using the same securities scenario discussed above, EAS 100 may be configured to only process account payout requests daily or hourly, etc. depending on the specific business process requirements.

Query engine 108 is a sub-component of EAS 100 responsible for converting queries from human readable format into a format capable of being executed on database 102. In particular, after converting the query to a suitable format, Query engine 108 may first interface with entity service 104 to actually execute the query on database 102. If the query is relational in nature, entity services 104 may provide the necessary logic to allow such a query to execute on a non-relational database. In a traditional system, queries are written in a highly technical format (typically SQL) by experience developers or database administrators. However, Query engine 108, according to embodiments, allows for such queries to be written by anyone, including non-technical users without needing to generate any new code.

Specifically, a "casual" or non-technical user of the system may be able to generate error-free queries by a guided process. EAS 100 guides the user on what variables may be used or what related tables may be accessed. Additionally, the data extracted for each user may be based on permissions and privileges for that specific user.

In an embodiment, query engine 108 may include pre-set limits on what data may be access based on where they query created from. For example, certain forms or screens in EAS 100 may limit the types of data that can be accesses. In a traditional system, a user must know the precise table structure and relationships in order to create queries. But embodiments of the present invention do not require such knowledge. In particular, the table relationships are inferred by configuration without the user needing to know each table/variable and how they are interconnected. The user may provide input relating to data that the user would like to search for.

In various embodiments of the present invention, user may be presented with a graphical user interface for query building. The interface may be configured to eliminate the possibility of the user selecting "wrong choices" (i.e., a non-related variable) when constructing the query. For example, a single click may bring up all of the variables of the current table, which can be selected for the instant query. A double-click may bring up all of the related tables (tables connected to the current table). And, if the user selects one of the related tables, the user may then be presented with the variables and relationships from that table. Accordingly, this sub-component may be used for as long as there are relationships with additional components or sub-components. However, at no point, will the user be able to select an "unrelated" variable, thereby eliminating any errors or performance issues.

Rules engine 110 is responsible for determining and executing the rules of EAS 100. The rules of rules engine 110 are capable of being configured and executed without any new programming code provided by the user. The specific functionality and components of rules engine 110 is further described with reference to FIGS. 4 and 5 below.

Data orchestrator 112 is responsible for synchronizing and validating data across EAS 100. For example, data orchestrator 112, according to some embodiments may be configured to ensure that identical persons or objects are properly managed throughout EAS 100. In addition, data orchestrator 112 may also be configured to validate variables, such as by ensuring they are entered in the in the correct format. Data orchestrator may also be configured to validate other data, such as ensuring that that dates occur chronologically in the correct order. Data orchestrator 112 may also be configured, according to some embodiments, to indicate errors in data entry to a user. The specific functionality and components of data orchestrator 112 is further described with reference to FIG. 6 below.

Report Engine 114 is responsible for configuring and generating reports within EAS 100. Report Engine may generate such reports by querying database 102. In particular, report engine may interface with database 102 either directly, through entity services 104, query engine 108, or a combination of such interfaces. Report Engine 114 may be configured to generate reports in a number of formats, such as EXCEL format, CSV format, or other formats, including PDF, text, or third party APIs. In an embodiment, report engine 114 may be configurable through third-party report generation tools, such as the ECLIPSE FOUNDATION's BIRT tool. The reports generated by report engine 114, according to embodiments, may also be scheduled to run automatically on a periodic basis or specific dates.

Example Process Model

Figure 2:
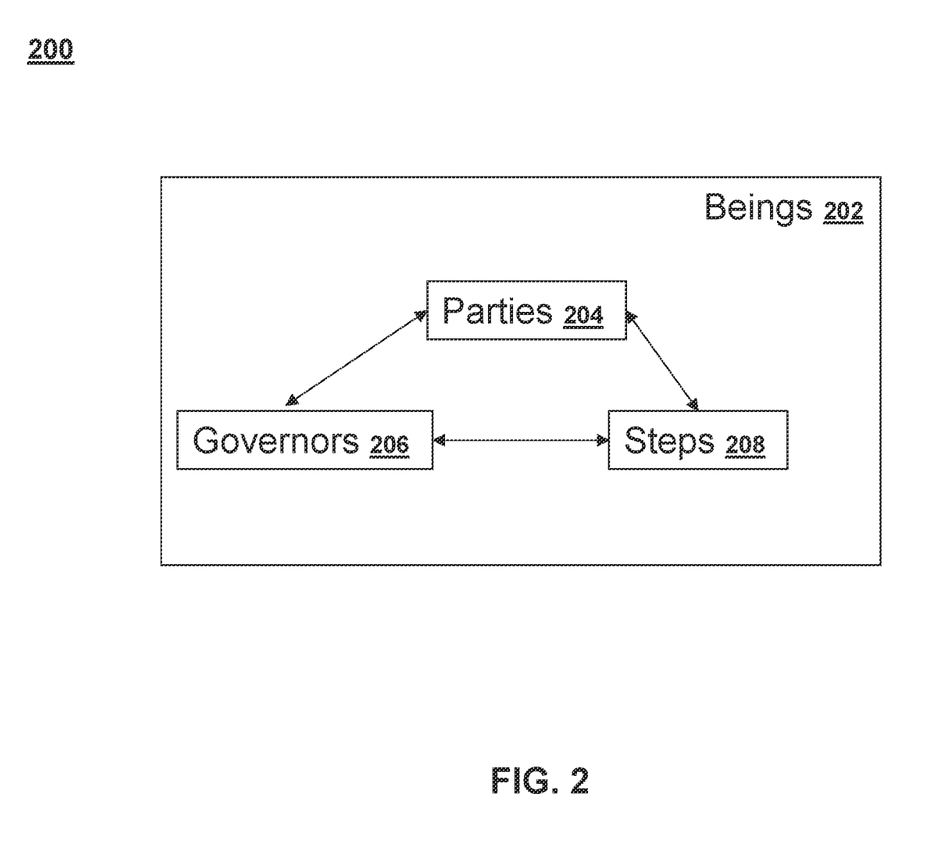
FIG. 2 is a diagram that depicts the process modeling aspects of an example data model, according to embodiments of the present invention.

FIG. 2, is a diagram that depicts the process modeling aspects of an example data model 200 of database 102, according to embodiments of the present invention. In general, when configuring EAS software, the first step is generally to perform something known as a process modeling. Process modeling generally involves determining the processes a business would like to automate in its EAS, and the steps involved in those processes. Embodiment of the present invention, rely on a classification system built into a data model to represent these processes. In particular, the data model 200 may classify business processes or modules into classifications of behavior, such as beings 202. Beings 202 may include parties 204, governors 206, and steps 208. Parties 204 represent participants in a transaction. For example, the nouns—like an employee, a client, and a security. Steps 206 represent the transactions of a process. For example, the things being done, such as including, but not limited to, a trade (for a security), an interview, a sale, putting in a purchase order, onboarding a new employee. Governors 206 represent the rules that govern parties 204 and steps 208. For example, governors 206 may include rules such as including, but not limited to, the rate at which a party 204 may be charged for a transaction, whether or not an account can have more than 30% of its portfolio in fixed income.

By employing such a classification system, including the subcategories discussed further below, data model 200 may assign certain pre-defined behaviors and rules to governors 206, parties 204, and steps 208. These behaviors and rules may be based on the pre-defined established relationships between governors 206, parties 204, and steps 208. For example, according to an embodiment, and as explained further below, certain parties 204 have known relationships, which have associated known rules and behaviors. Thus, by classifying processes into parties 204, governors 206 (or rules), and steps or activities 208, data model 200 may include pre-defined behaviors and rules that are applicable to the vast majority of use cases for business processes. These pre-defined behaviors may be further refined based on sub-categories of parties 204, governors 206, and steps 208.

Specifically, in an embodiment, parties 204 may have further subcategories, such as:

- Elders or anchor parties, which may represent a key party or offering that anchors an application defined by some internal relationship to the organization that uses the EAS, such as, for example, a client or an employee.
- Surrogates or accounts, which are vehicles for an Elder. For example, an "account" for a "client". A surrogate may not exist without a corresponding Elder.
- Kith or accessory anchor parties, which may represent a key party that anchors an applications wherein its core definition is not based on a relationship to the organization that uses the EAS; for example: issuer or bank.
- Deputies or accessory accounts, which may represent processes for a Kith. For example, a "security" for an "issuer" or an "account" for a "bank." A surrogate cannot exist without a corresponding Kith.
- Litters or lots, which may represent a purchase or holding of a core parties and some offering on a particular date. For example, a store purchases 100 loaves of bread on a Friday. Litters may aggregate to a hybrid.

Hybrids or positions, which may represent the aggregation of two or more core parties. For example, an inventory loaves of bread from multiple individual loaf purchases.

As explained above, data model 200 may assign pre-defined behaviors to each of the different sub-categories of parties 204. For example, surrogates have a known relationship with an elder. A surrogate cannot exist without an elder. Thus, in embodiments of the present invention data model 200 may include certain default behaviors that ensure that a surrogate does not exist without an elder. However, according to other embodiment of the present invention, data model 200 may include many other different types of default behavior based on relationship between parties. These behaviors can be further broken down into steps 208. Steps 208, as explained above may represent the transactions for a process. Steps 208 may be further broken down into different sub-categories, such as:

Chaperones or onboarders, which represents the step or steps used to create a core party, such as an Elder, Surrogate, Kith or Deputy; for example, turning an applicant into an employee.

Usher or offboarders, which represents the step or steps used to remove a core party (i.e. terminating an employee) Escort financial/nonfinancial activity, which represents the ongoing transactions that are a part of a party's lifecycle, for example, sending paychecks to an employee.

Seeds or starter subactivity, which represents the finite steps that cause a Shepherd, Usher or Escort to be created; for example, putting in an application that begins a candidate process (small step that starts the onboarding process).

Guests or subactivity, which represent side-transactions unrelated to the core function of a Shepherd that still may occur within the lifecycle of a Shepherd, Usher or Escort; for example, interviews in the candidate process.

Governors 206 may also include a number of sub-categories of rules that govern behavior of parties 204 or steps 208, such as:

Organizers or triggers, which may represent rules that outline what documents to send or collect when updating, creating or killing a process because of a change in another process. For example, when an employee submits a resignation, before offboarding the employee send them a copy of their signed non-compete agreement.

Validators, which represent rules used to limit parties 204 or steps 208 or validate data is within an allowable tolerance. For example, an account must have between 20-30% in bonds or an employee must meet certain criteria before they may be eligible for a promotion.

Setters or parameters, which represent specific rules of a party. For example, a security must have terms, an account must have a management fee, and an employee must be paid every 2 weeks.

As explained above, each of the beings 202 may have its own pre-defined behaviors that are built into the platform (based on expectations of the way these abstracted beings are anticipated to operate, regardless of the specific use-case). For example, since there is a relationship between the Surrogate and Elder, certain behavior (rules governing) must at least partially be based on that relationship. As another example, when you create an Escort, they exist only in connection with a relationship with a Party.

When a new business "real-world" process needs to be generated for an end-user/tenant, the user of the EAS will typically describe the process in business terms. These business terms may then be mapped to the beings 202 described above. And as specific beings 202 are selected, data model 200 will determine generally how the overall business process must behave based on the pre-defined behaviors discussed above.

For example, in defining a process, if a Surrogate is used, the system knows that an Elder also must exist, because a Surrogate cannot exist without an Elder. Moreover, in connection with generating new party 204 processes, data model 200 will expect (and require) that certain steps 208 and/or governors 206 may also need to be created. For example, because of the relationship between Elders, Surrogates, and Setters, regardless of the process or sector, the data model 200 requires certain steps 208/governors 206 to occur. Consider an example of a hotel chain, which has a number of hotels, each with a number of rooms at specified rates. In such a case, data model 200 may have Elders representing each of the hotels in the hotel chain, with Surrogates representing each of the rooms, and Setters representing the room rates. Because a surrogate may not exist without an entity, when a room row is added, data model 200 may require an Elder row for that specific hotel. Likewise, because the Setter may be linked to a specific party 204, data model 200 may also require an entry in a rate row (Setter) for each room (Surrogate).

The initial process modeling for a given industry sector (or perhaps specific end-user) may generally follow a two-step process. First, having defined generally the abstract/generic entity types that will be used to model a specific business process, the data model 200 may impose certain specifications on the process model. Users may be guided to make sure that the behaviors data model 200 expects, given the selected entity types, is implemented in the particular process model. It is during this step, that the outside world, in a sense, starts to actually filter into the process model. The second step may involve a first effort to fine-tune the process model based on actual conditions. For example, a module of the overall application may contain the following processes (intended to assist with fine-tuning the process model): (a) a process to define drivers or table partitions; (b) a process to define row uniqueness; (c) a process to define relationships between tables, (d) a process to fine-tune the data model; (e) a process to fine-tune the rules hierarchy; (f) a process to fine-tune validations and requisites.

In this sense, the effort of creating a process model is guided by the built-in intelligence and thereby may be greatly streamlined and accomplished much more quickly. That is, when going through the process of process modeling, as a process is built, once the data model 200 is told which being types (entity types) are to be used to describe the process, it knows roughly speaking how the process will behave and only fine-tuning needs to occur, rather than wholesale generation of processes from scratch.

Example Data Dictionary

Figure 3:
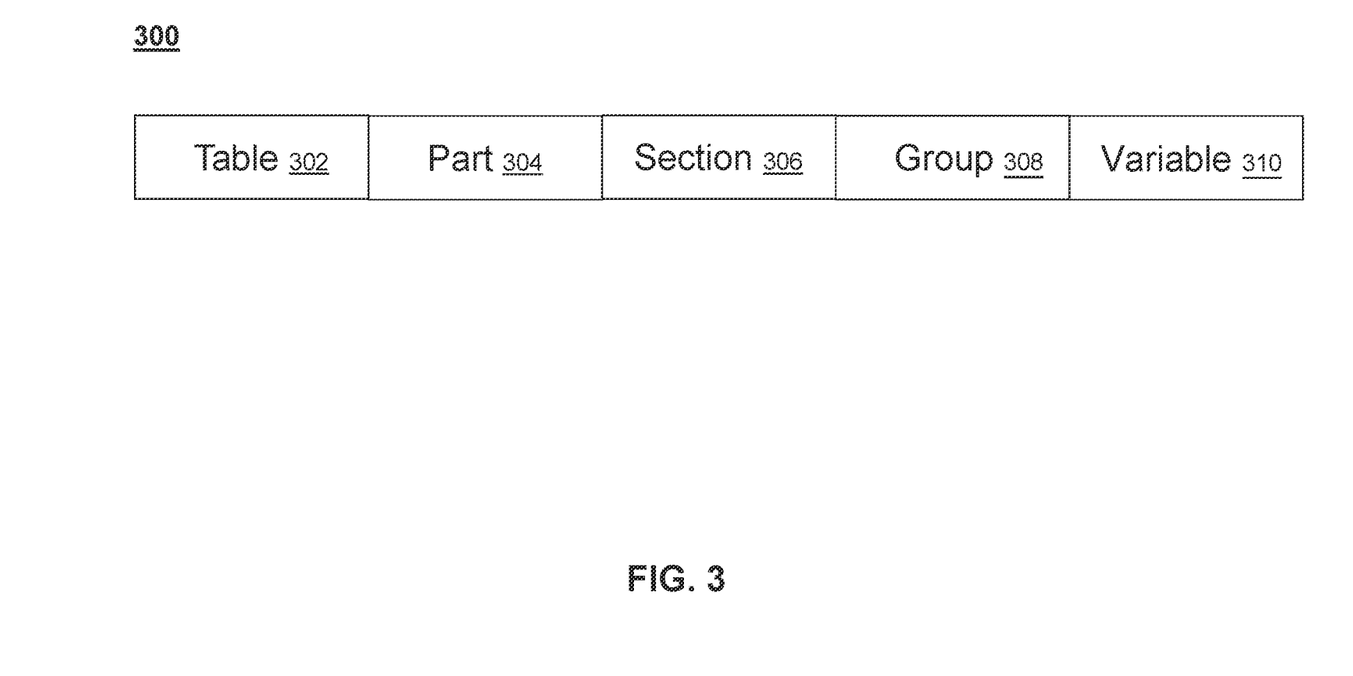
FIG. 3 depicts an example data dictionary classification scheme for a data model according to embodiments of the present invention.

FIG. 3 depicts an example data dictionary classification scheme 300 for data model 200, according to embodiments of the present invention. Data model 200 stores variables related to business processes. These variables may also be thought of or referred to herein as "columns," such as columns in a database table. Ultimately, however, there exists an infinite number of database variables with an infinite set of requirements for such variables. Yet, although there may possibly be an infinite number of variables, there exists a relatively small number of unique types of variables.

And according to embodiments of the present invention, data model 200 is pre-configured with a data dictionary that has been distilled down to these unique types of variables.

For example, consider the variable of a person's first name, Such a variables may have any of the following acceptable names, even though it is describing the same piece of data:

Name
First name
Name, first
Surname
Birth name
Forename
Given Name
Baptismal name Based on the actual examination of millions of variables across a very large number of prior-art applications and systems, embodiments of the present invention have distilled those millions of possibilities down to several thousand "generic" variables, which may be used by any organization in any situation with little or no customization. In an embodiment, the data dictionary variables are described using a multi-part variable known as a Specific, e.g., Specific 300 of FIG. 3. Specific 300 thus may be represented as a structure that classifies variables in data model 200.

In particular, particular, Specific 300 may have five classification categories: table 302, part 304, section 306, group 308, and variable 310.

Table 302 may indicate to which process or table the given variable applies. For example, the variable may apply to an entity table as described above or any other table of the system.

Part 304 may be a top-level, general category. For example, part 304 may including the following categories: (i) Referencing (which may be system variables, with default placement into all processing; for maintaining basic information such as rowkey, version serial, record tenancy, system time and as-of date); (ii) Content (which may be system variables, with default placement into all processes to store content rack references, such as document path); (iii) Converted (for example, whenever a currency number variable is present, a mirror converted variable may be created to handle the currently conversation generically across the suite); (iv) Dates (which may be business variables, selectively placed; to maintain milestone dates, repeating schedules, as well as parameters to generate repeating schedules); (v) Directory (which may be business variables, selectively placed and availability-limited by entity type; for name and contact information); (vi) Events (which may be business variables, selectively placed and availability-limited by entity type; historical event tracking such as education and employment); (vii) Identifiers (which may be business variables, selectively placed and availability-limited by entity type; unique key for processes, such as SSN for a US individual or EIN for a US institution); (viii) Metrics (which may be business variables, selectively placed; to store analytical results); (ix) Numbers (which may be business variables, selectively placed; to store transaction numbers); (x) Orchestration (which may be system variables, with default placement into processes; to maintain workflow tracking information, such as mode, status, dependency check, approval, action, etc.); (xi) Relationships (which may be business variables, selectively placed with availability limited by entity type; to maintain foreign-key information to other processes); and (xii) Tags (which may be business variables, selectively placed; to list variables, including both driver variables—important process "behavior classifiers"—as well as other attributes, verticals, geography, etc.).

Section 306 is a subcategory of part 304. In particular, section 306 may represent subcategories for each of the part 304's categories. For example, under the part 304 category labeled "Numbers", the following different "numbers" of categories may exist: (i) Adjusted (which may store the corrective processing number from the prior version to help with accounting); (ii) Allocated (which may store the number allocated per related party relationships); (iii) Arranged (which may store the number changed per series of milestone dates); (iv) Classified (which may store the number allocated per repeating list value, such as beginning ledger balance for a chart); (v) Freeforms (which may be user-created additional number variables in the tenant environment); (vi) Linked (which may store the number allocated per related linked transaction processes); (vii) Scheduled (which may store the number changed per schedule); (viii) Rescheduled (which may store the number changed per reset schedule); (ix) Subsequent (which may store the current number when the number changes daily); and (x) Summary (which may store transaction currency and base currency, as well as increment for price and quantity).

Group 308 may be a lower-level sub-category of section 306. For example, under the section 306 category "Original", the following group 308 categories may exist: (i) Initial (which may be the gross number); (ii) Modification (which may reflect a premium or discount); (iii) Interim (which may be the gross number plus/minus a sum representing a premium or discount); (iv) Adjustment (which may represent interest, tax, or a dividend); (v) Final (which may be the interim plus/minus some sum/adjustments); and (vi) Memo (which may be any additional numbers to be notes, such as a gain or loss)

Variable 310 is the lowest-level category and is a subcategory of group 308. For example, under the group 308 category of "Initial", the following variables may exist: (i) Amount; (ii) Quantity; and (iii) Rate.

In an embodiment, Specific 300 may also include a tag that correlates the variable to different beings 202. This may allow for variables to be automatically created when certain beings 202 are created.

By using the classification scheme of Specific 300, data model 200 may also be able to group variables together in a manner such that non-relational databases may be used in embodiments of the present invention. In particular, a traditional relational database system may have multiple tables with variables, such as "persons," "employees," and "managers," each representing the different types of individuals that may be stored in the database. However, in embodiments of the present invention, using the variable 300-classification scheme, each of these variables can be stored as columns in a single table. As a result, significant efficiency gains may be achieved because variables that previously may have been needed to be stored in separate tables, may, because of the Specific 300-classification scheme, be stored in a single table. This may allow for more efficient searching because a single table may be loaded into a system's memory instead of separate tables.

According to embodiments of the present invention, Specific 300 may also include hierarchical source data. In particular, in some instances, the data of variable may be sourced from a variety of sources either internal or external. For example, in the case of securities, pricing information may be obtainable from a number of different sources. According to an embodiment of the invention, Specific 300 may be able to associate with hierarchy of these sources.

That is the data can be obtained from these sources by priority. For example, continuing with the security pricing example, a variable may have a SOURCE A designated as the highest priority source for data of the variable. But if SOURCE A becomes unavailable, then the data may be automatically gathered from a SOURCE B. Notably, data sources are not limited to only external sources such as API, variable data may be obtained from a variety of sources, including internal tables to the EAS (with computed variables) or other applications running within the same enterprises. In all such cases, Specific 300 may be configurable with hierarchies of data sources.

In an embodiment, Specific 300 or the EAS may track which source the data was actually obtained from for Specific 300. In such cases, a user of EAS may be able to determine for each variable the sourcing information for that variable. That is, which data source in the hierarchy of data sources was used to source the data for Specific 300.

Example Rules Engine

Figure 4:
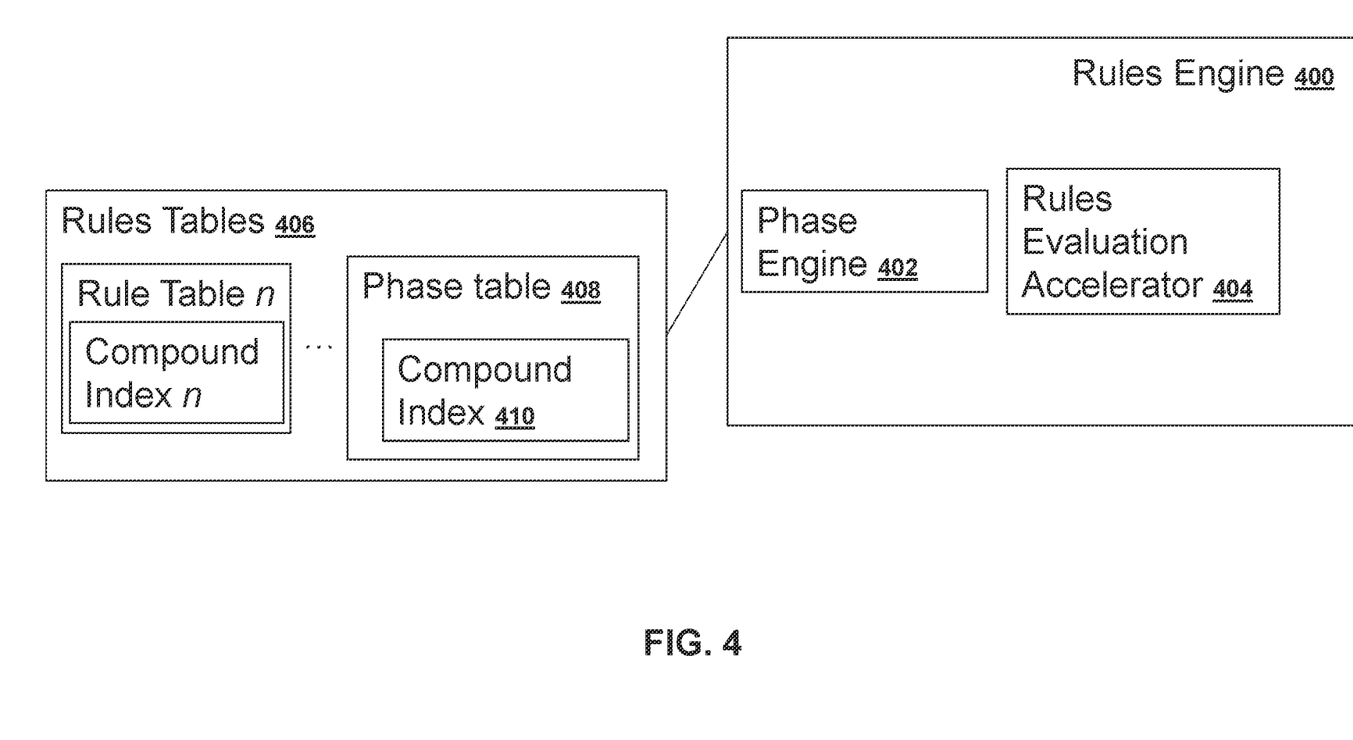
FIG. 4 is a block diagram of an example rules engine according embodiments of the present invention.

FIG. 4 is a block diagram of an example rules engine 400, such as rules engine 110 of FIG. 1, according embodiments of the present invention.

As explained above, the rules engine, such as rules engine 400 of FIG. 4 or rules engine 110 of FIG. 1 is responsible for executing the rules of EAS 100. These rules may be applicable to a wide variety of aspects of EAS 100, such as how to setup the graphical user interface of EAS 100, validation rules, or the precise steps that need to execute in a business process. As explained above, the rules themselves are stored within rules tables 406 of a database, such as database 102 of FIG. 1. According to an embodiment, rules tables 406 may each relate to different categories of rules, such as for example, validation rules, button rules, GUI screen rules, business process step rules, phase engine rules, etc. Rules engine 400 however operates the same, however, regardless of the type of rule being executed.

According to an embodiment, rules engine 400 includes a number of subcomponents, such as phase engine 402, and rules evaluation accelerator 404. Although, according to other embodiments one or more of these components may be combined together.

Phase engine 402 is responsible for controlling the execution of rules within EAS 100. According to an embodiment, the logic of the phase engine 402 is accomplished through data populated in a rules table, such as a phase table 408 within rules table 406. For a given scenario, the list of operations (also referred to as rules) to be performed and the order in which they are to be performed may be provided as data in a row in phase table 408. Because these operations of phase engine 402 are specified in phase table 408, they may then be modified at a later date without have to provide any new additional code.

According to an embodiment, phase table 408, may include operations representing a lifecycle of a record specified in a sequential manner as rows. Specifically, at least one operation that may occur with respect to a given record may be given a number corresponding to its place in the sequence of operations that may be performed on a record. For example, the life cycle of a record may, at a high level, generally start with its creation, then modifications may occur, and then ultimately the record is terminated or deleted. And each of these general operations (creation, modification, and deletion) may themselves have many sub-operations/rules (such as varying degrees of validation, different modifications, etc.) In this manner, the operations of a record may be sequentially numbered and stored in phase table 408. Accordingly, given that all of the operations that may occur with respect to a given record (e.g., executable with respect to the give record) are stored as sequential row in the phase table, phase engine 402 may only need a range corresponding to the sequence number of the operations to know which operations to execute.

Phase engine 402, according to embodiments, may also operate the same way regardless of manner in which data enters the system or needs to be operated on—via (manual) user data entry, via file-save (data-stream) or via workflow. In some embodiments of the invention, phase engine 402 ensures that all three instances go through the sequence of operations stored in the phase table, thereby maintaining synchronization. In other embodiments, phase engine 402 may specify a different set of operations within the phase table or a different order of operations to be called, depending on the manner in which data is received by the system.

Because, as noted above, a large portion of EAS 100, including phase engine 402, relies on the querying and execution of rules, it may be important that rules engine 400 is able to perform these functions quickly and efficiently. One method rules engine 400 may rely upon to increase performance is the use of compound index 410 and rules evaluation accelerator 404.

In particular, as described above, through the use of the phase engine 402, embodiments of the present invention work their way sequentially through a series of operations that phase engine 402 determines need to be called. One by one, various operations are called. If the operation in question requires data from a particular row in a particular table, phase engine 402 will have been provided with the identity of the specific table to be called, but it will not know which specific row in that table applies to the specific situation. For example, if the system in question has called an operation to verify that all of the required columns of a given row have been properly populated with data, it may need to call the table containing the rules for required fields. Each row of that table will contain a different rule.

For example, one rule may be: "If the client sector=life insurance", and then required columns may include "policy number", "policy initiation date", etc. Another rule may be "If the client sector=life insurance AND activation date>01/01/2019", and then required rows may include a different set of columns. Each rule may require a certain number of conditions to have been met. In the previous example, the first rule only required on condition to be met, while in the second rule, two conditions needed to be met for the rule to apply. Accordingly, each table within rules tables 408 includes a compound index 410.

Compound index 410 may configured to create an index to check the designated format of the variables for each column in a given rules table to see if they fall within a specified sub-set. For example, compound index 410 may look for every column of a given rules table which meets any of the following formats: (a) clarifier (for example, a variable like "birth date" which will be compared to some value; (b) comparison (the rule, such as "equal to", "greater than", etc. that will determine the manner in which the clarifier will be compared); or (c) clarification (the thing against which the clarifier will be compared, such as a specific date). As just one example, a column containing a clarifier may have an entry "client sector", a column containing a comparison can have an entry "equals", and column containing a clarification can have an entry "life insurance." Essentially, these are the columns that provide the "IF" part of an "IF, THEN" statement or a rule.

Moreover, each of the variable formats for which compound index 410 is searching may be provided with a weighting, indicating a relative importance within a given rule as compared to other variable formats. Thus, compound index 410 will maintain an index of the rules in every given rule table at all times. Further, when a new rule (row) is added to a rule table, a current rule is modified, or a rule is eliminated, compound index 410 will revise and update the index for that rule table in real-time.

Additionally, compound index 410 may create a separate list for each one of the rules tables that identifies a relevant "match-key" sub-set of the generic variables it was told to search for in order to create an index for that rules table. For example, in various embodiments, compound index 410 may also create a list of all "clarifier" variables used in the rules table.

Thus, each time compound index 410 is presented with a row of data for which a determination needs to be made as to which specific rule (row) in a rules table is to be used, a match key will be prepared from that data row using only the values for that row in columns containing one of the specific match-key variables. It then performs a search of the index it has already prepared for that rules table in order to more efficiently determine the specific rule (row) to apply.

In embodiments of the invention, one of another of various different types of searches may be performed by compound index 410 using the index for the relevant rules table. For example, in one embodiment, the utility in question may specific the return of the "best match" from the relevant rules table. In that instance, compound index 410 will start by comparing the match key against rules with the most comparisons and work its way to rules with the least comparisons. For example, a rule calling for BOTH sector equaling "life insurance" AND "activation date>01/01/2019" may make a match BEFORE a rule and by calling for sector equal to "life insurance" (without any comparison for activation date).

In other embodiments of the invention, a different type of search may be performed by compound index 410 in which "all matching rows" will be returned. For example, compound index 410 may identify BOTH: (a) a rule calling for "sector equals life insurance" AND another rule separately calling for "activation date>01/01/2019."

After compound index 410 identifies the row or rows in the rule table which apply to the row of data on which operations are being performed, the operation that is currently executing may use the data from the identified row (in the identified table) to finish its work and notify the phase engine 402 that it is done (and to move on to the next operation).

Example Compound Index Method

Figure 5:
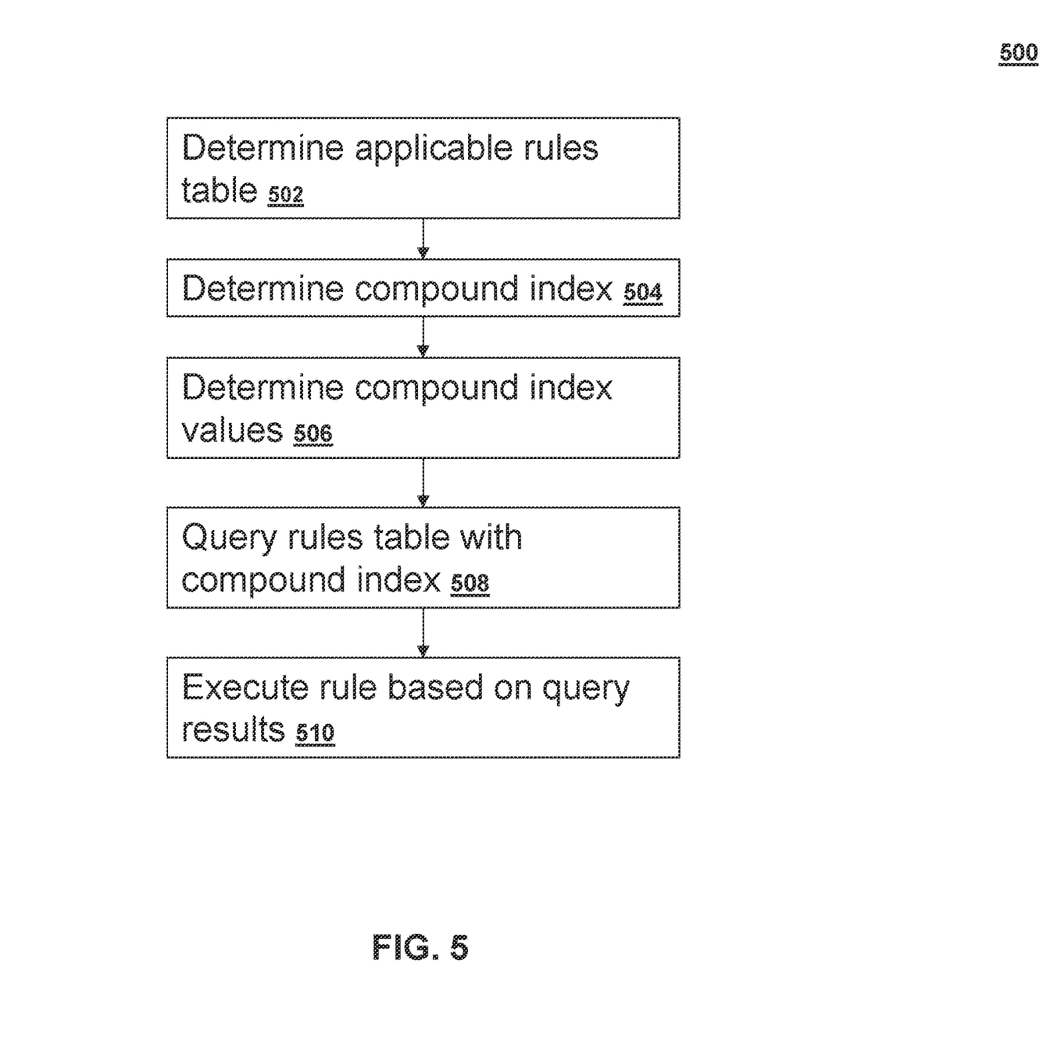
FIG. 5 is a flow diagram of an example method for implementing a compound index, according to embodiments of the present invention.

FIG. 5 is a flow diagram of an example method for implementing a compound index, according to embodiments of the present invention.

At step 502, a rules table (e.g., applicable rules table) may be determined. According to an embodiment, a given rules table may include a set of parameters for executing any given rule. That is for any given rule or operation within EAS 100, the applicable rules table (but not the rule itself) may be known. For example, in a case of performing an operation with respect to a record, EAS 100 may know that a phase table, such as phase table 408 of FIG. 4, is to be checked.

At step 504, the compound index may be calculated for the applicable rules table determined in step 502. As explained above, the compound index may be calculated by determining each of the variables used in the specified rule table. In an embodiment, the rules may take the form of a clarifier variable, comparison variable, and clarification variable. For example, in the case of a rule that determines if a birthday is equal to a particular date, a clarifier variable, may be "birth date," a comparison variable may be "equal to," and a clarification variable may be the specific date. The index may be based on clarification and comparison, while clarifier may be used to determine a position of the rule in the compound index.

At step 506, the compound index values are determined. Specifically, in this step, the values applicable to the specific rule are calculated in order to locate the applicable rule in the rules table that matches the compound index. For example, in the birthday example discussed with respect to step 504, after the compound index is calculated, it is known that the particular rules table compound index is clarifier+comparison+clarification variables. Thus, in order to locate a rule in such a rules table, one must have a known value for the clarifier, comparison, and clarification variables. In the case of the "birthday" example discussed above, a clarifier+composition+clarification compound index may be "birth date," "equal to," and the specific date, according to an embodiment.

At step 508, the rules table is queried with the specific variables in the compound index. As discussed above in step 506, in the case of the birthday example, "birth date," "equal to," and the specific date, in combination, may be used to query the applicable rules table. The specific rule that has a compound index with a clarifier+comparison+clarification that matches "birth date," "equal to," and the specific date may then be located.

At step 510, the specific rule that is located because of the query at step 508 may be executed.

Data Orchestrator

Figure 6:
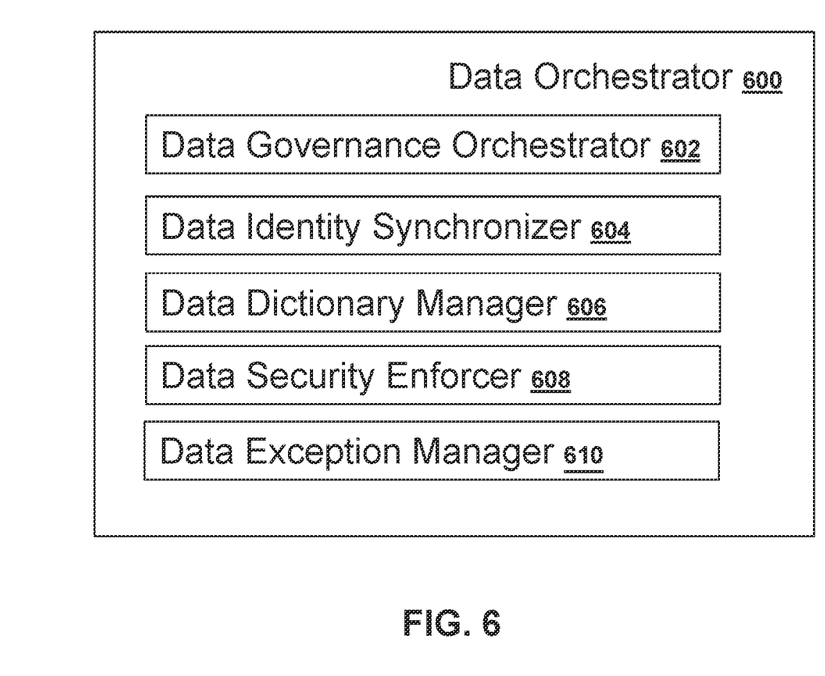
FIG. 6 is a block diagram of an example data orchestrator, according to embodiments of the present invention.

FIG. 6 is a block diagram of an example data orchestrator, such as data orchestrator 112 of FIG. 1, according to embodiments of the present invention.

As discussed above, data orchestrator 600 is responsible for synchronizing and validating data across the EAS, such as EAS 100. Data orchestrator 600, according to some embodiments, may include a number of subsystems, such as data governance orchestrator 602, data identity synchronizer 604, data dictionary manager 606, data security enforcer 608, and data exception manager 610. The functions of each of these systems is described in further detail below.

Data governance orchestrator 602 is responsible for governing integrity and security of data used in the EAS. In an embodiment, data governance orchestrator 602 may be configured with default rules that are automatically enforced, but which allow authorized Data Governance specialists to modify or add rules in real-time through an easy-to-use configuration interface.

Required Field Enforcer

In an embodiment, data governance orchestrator 602 may include a required field enforcer sub-component that may ensure that fields designed as "required" are, in fact, properly populated before a record will be accepted as "complete" or "active" in the system. These required fields may be stored in a rules table, such as rules table 406 of FIG. 4. Thus, using a compound index and a phase engine, these required field rules may be determined for a given record/process. Moreover, because the required fields may be stored in a rules table, they may be modified without having to create any new code.

In an embodiment, a pre-populated set of required fields will be provided to end-users and will be enforced by the required field enforcer. And in some instances these required fields can be added, removed, and modified by a large set of users of the EAS. However, in an embodiment, some of the initially required variables may be non-configurable by design. For example, certain variables may be required by a given system from a computational perspective, from a workflow perspective, or because of other considerations. Administrators may have exclusive access to modify this list of required variables. Other variables, however, may be configurable—that is, changed from required to not required, or from not required to required. Users may be given access to table that illustrates the current list of required variables, which may be customizable by a given user. And any changes made would be made in real-time and instantly applied to any request, regardless of the manner in which information was received.

According to an embodiment, data governance orchestrator 602 may include a relationship validator, which may ensure that valid relationships exist in a record before it is stored or activated in a database. For example, before a submitted record will be considered active or complete, the phase engine may include one or more operations that will check to make sure appropriate relationships exist between the row and other processes within the system. Moreover, the system may also determine what related records need to be, for example, withdrawn, cancelled or completed before the current record to be revised or withdrawn. As with other rules to be applied, they will be stored in an appropriate "relationship validator table", while the appropriate rule to apply to a given situation will be determined by a compound index Data Validation Enforcer Data governance orchestrator 602 may also include a data validation enforcer (which may also be thought of as a data quality enforcer) sub-component that configures and enforces validation rules for fields. For example, before a submitted record will be considered completed, the phase engine may include one or more operations that check various types of validation rules for each variable. Examples of validation rules can include:

Schema-level validations: for example, "this variable must be a number". Given that this type of validation relates to the schema, embodiments including a data validation enforcer that performs schema-level validations may reserve the ability to change validations to a small set of authorized personnel.

Non-industry-specific validations: for example, the "birth date" (genesis of something) may need to happen chronologically before its "death date" (termination of that thing). As a specific example, a person's hire date (the start of their employment), must precede a person's separation date (the end of their employment) or the underlying information wouldn't make sense Industry-specific validations: for example, in the asset-management industry, ensuring that securities do not mature later than a specific date.

Two separate types of validation may occur: error validation and warning validation. In an error validation, a given record may not be considered "complete" or active, or progress to the next level of the phase engine, unless it passes all necessary validations. In a warning validation, a user may be notified without stopping the record from completing or becoming active.

Data identity synchronizer 604 is configured to synchronize identical "persons" or objects across the EAS, such as EAS 100. In particular, data identity synchronizer 604 may determine that the same "identity" occurs in multiple tables/processes, consolidate critical information in a central location, and permit the EAS to control the dissemination of the information across processes, systems or uses In particular, according to an embodiment, data identity synchronizer 604 may further include an ID hierarchy setter that may define and apply primary IDs and/or primary ID hierarchies (starting with primary IDs that are of higher importance), through configuration, for enterprise processes. In such a cases, one of the operations executed by a phase engine may be to verify that a given row represents a unique identity. That is, in some use cases, the row may not duplicate the identity associated with a row already present in the system. As just one example, if a row is created into the system identifying a new employee as "John Smith", before allowing the record to "complete", the system will check it against previous identities to avoid creating duplicate records, for example.

But in the case of an individual, there are several pieces of information (and hence variables) which may uniquely identify the person—social security number, driver's license number, passport number. But it is possible that not all records contain information for all possibly identifying variables. Some employees might not have a driver's license. Others might not have a passport. Others might not be U.S. citizens and therefore not have a social security numbers. Accordingly, data identity synchronizer 604 may make a call to the table storing rules regarding Primary IDs (in this case, known as a "restrictor"). This table may maintain a hierarchy of which variables to check (in what order) to ensure that the row being processed relates to a unique identity.

According to an embodiment, data identity synchronizer 604 may also include a person's cataloger that may catalogue all unique persons (identities) across diverse processes in an enterprise. That is, the same person (or same identity) may be present in multiple tables or multiple ways in an enterprise system. For example, consider a university's data, the same person may be both a student (and therefore found in a "students" table) and a professor (and therefore found in a "professors" table). Yet, that person still only represents one unique identity. Moreover, for compliance purposes, it may be important to know all of the tables of which a given unique identity is a member. Accordingly, in embodiments, a person's cataloger may provide a central table that catalogs all unique persons with information that indicates all of the tables on which they are a member.

Data identity synchronizer 604 may also include a person's information distributor that may configure and execute rules for sharing persons information across diverse enterprise processes. Specifically, it may be possible, that the same information may be used to populate multiple tables. And in such cases, such data may need to be synchronized. For example, consider a human resources system for a university. A given individual may be both a student and a professor, as discussed above. As such, their address may be included both in the context of their information as a student and their information as a professor. If the person changes addresses and updates that information the next time they register as a student, although the change will be made to their address in the context of being a student, it might be desirable to have that change propagated elsewhere in the system, so as to change some of their information also in the context of a professor.

In any embodiment, data identity synchronizer 604 may maintain a table that indicates whether the publishing of information into one table may automatically publish to other tables. As a phase engine works through the various steps to act on a submitted row, it may call the appropriate the persons information distributor of data identity synchronizer 604, thereby ensuring that appropriate data is shared among the tables.

Data Security Enforcer

In an embodiment, a data security enforcer 608 may be responsible for ensuring data security, privacy, and confidentiality. The EAS may consider a login person and/or a system as being a "user." A given user's access to EAS and its data may be controlled via a permission engine. The Permission engine may be configured to grant access with granularity, e.g., to a user not only at the process level, but also for a specific records or groups of records with a certain limiter or clarification, in some use cases. Access may also be controlled per variable, for example.

Role-Based Default Permissions

In an embodiment, a given tenant (client) may define default access rule per process in PERMISSION based on a given ENTITY and/or TEAM the user belongs to, a responsibility (role) of the user, any additional characteristics of the user, or any combination thereof, among other potential factors. Such a definition may facilitate role-based access control across an enterprise. If a certain user has a specific access request that deviates from the default role-based permission, the PERMISSION rule may be overwritten for the specific user.

For example, an administrator or privileged user may configure a first permission rule (i): any user who is an employee has RESPONSIBILITY as PORTFOLIO MANAGER and belongs to HIGH YIELD STRATEGY team can only access to SECURITY of ASSET CLASS=FIXED INCOME. An additional example may include a second permission rule (ii): any user who is an employee has RESPONSIBILITY as PORTFOLIO MANAGER and belongs to EQUITY LONG SHORT team can only have access to SECURITY of ASSET CLASS=EQUITY, and within those records have access to all columns except cashflow projection(s). Further per the previous example, an administrator or other privileged user may configure a third rule (iii): John Smith, who is a PORTFOLIO MANAGER on EQUITY LONG SHORT team, overwriting default access rule (ii) for the specific target user (John Smith), to grant him full access to SECURITY process, including access to any cashflow-projection variables. Anyone else in these examples who is a PORTFOLIO MANAGER on EQUITY LONG SHORT team will follow permission rule (ii), and John Smith's EAS access will follow permission rule (iii), in accordance with this non-limiting example embodiment.

Central Access Control for Login Users and Integrated Systems

Data security enforcer 608 may apply to a user login via the UI in the same way as to a system integrated via FILE/API interface, according to some embodiments. Data security enforcer 608 may provide EAS administrator a consolidated view of all access rules. Continuing with the previous example, similar to John Smith's permission rule setup, an EAS administrator or other sufficiently privileged user may configure a fourth access rule (iv): XYZ analytics to receive EAS daily feed but only limited to SECURITY of ASSET CLASS=DERIVATIVES.

Access May be Defined at Different Levels

Permission may be granted, according to some embodiments, at a level of a table, a record, and/or a variable, for example. Additionally, or alternatively, access authority may be separated into no access, read-only, or read/write. This separation may allow further granularity for an EAS administrator to fine-tune the access per role and further per user. Continuing with the previous example, an administrator or sufficiently privileged user may configure a fifth permission rule (v): SECURITY ANALYST may be granted read-only access to SECURITY of ASSET CLASS=FIXED INCOME, and read/write access to SECURITY of ASSET CLASS=EQUITY and DERIVATIVES. In addition, the fifth permission rule may be applied when rendering a dropdown menu in a UI for the system. If the user has no access to SECURITY of ASSET CLASS=FUND, then relevant information corresponding to FUND will show up in the reference list in a dropdown menu for a SECURITY ANALYST user to select.

Data Exception Manager

In some embodiments, data exception manager 610 may be responsible for triggering workflows when an error is encountered. As just one example, a rule may exist such that if the price of an individual security changes by more than a pre-established percentage in either direction, the price may require approval by a "group" within a company before the price is used in calculations.

Example Computer System for Embodiments of Present Invention

FIG. 7 is a block diagram of an example computer system 700 that may be used to implement embodiments of the present invention.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure or bus 706 through user input/output interface(s) 702.

One or more of processors 704 may be a graphics processing unit (GPU). A GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main or primary memory 708 may include one or more levels of cache. Main or primary memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), Protocol Buffers (ProtoBuf) or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main or primary memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments may operate with software, hardware, and/or operating system implementations other than those described herein.

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A system, comprising:
   a memory;
   at least one processor coupled to the memory;
   a database configured to store a data model and a plurality of rules tables, wherein the data model includes at least one party, at least one governor, and at least one step, and wherein each rules table of the plurality of rules tables is further configured to store a plurality of rules;
a rules engine, coupled to the database, configured to:
access an applicable rules table of the plurality of rules tables;
determine a compound index for the applicable rules table;
calculate compound index values based on the determined compound index using at least one selected from the group of a clarifier, a comparison, and a clarification;
query the applicable rules table using the compound index values to locate a rule of the plurality of rules stored in the applicable rules table; and
execute the located rule;
a query engine, coupled to the database, configured to convert user defined queries into database-specific queries; and
a report engine, coupled to the database, configured to generate reports based on data stored in the database.

2. The system of claim 1, wherein the database is further configured to store a data dictionary.

3. The system of claim 2, wherein the data dictionary stores variables that are classified by at least a category and a subcategory.

4. The system of claim 1, wherein the rules engine is further configured to execute the plurality of rules stored in a rules table of the plurality of rules tables that is specified for a phase engine.

5. The system of claim 4, wherein the phase engine is configured to execute the plurality of rules stored in the specified rules table according to a sequence of operations stored in the specified rules table.

6. The system of claim 1, wherein the data model further comprises at least one pre-defined behavior assigned to the at least one party, the at least one governor, and the at least one step, wherein the at least one pre-defined behavior is assigned based on a pre-defined relationship established between the at least one pre-defined behavior and the at least one party, the at least one governor, and the at least one step.

7. The system of claim 6, wherein the at least one pre-defined behavior includes at least one default behavior.

8. A method, comprising:
storing a plurality of rules in a rules table, wherein the plurality of rules relate to phases in a lifecycle of a database record, wherein the rules table is stored in a database comprising a data dictionary, wherein the data dictionary stores a plurality of variables classified by at least a category and a subcategory, and wherein the data dictionary is pre-configured with a set of variables selected from the plurality of variables based at least in part on a configuration;
querying the rules table utilizing a compound index to locate a rule of the plurality of rules in the rules table, wherein the compound index comprises at least two columns in the rules table;
receiving the located rule from the rules table based on the querying, wherein the located rule specifies a sequence of operations executable with respect to the database record;
determining a sub-sequence of operations to be executed with respect to the database record from the sequence of operations specified in the located rule; and
executing the sub-sequence of operations with respect to the database record.

9. The method of claim 8, wherein each operation in the sub-sequence of operations is configured to be executed after a previous operation in the sub-sequence of operations is completed.

10. The method of claim 8, wherein the rules table is stored in a data model configured to include at least one party, at least one governor, and at least one step.

11. The method of claim 8, wherein the querying the rules table utilizing the compound index further comprises:
accessing the rules table, wherein the rules table is an applicable rules table selected from a plurality of rules tables;
determining the compound index for the applicable rules table; and
calculating compound index values based on the determined compound index; and
querying the applicable rules table using the compound index values.

12. The method of claim 8, wherein the compound index maintains a current index of the rules table by updating the current index of the rules table when modifications are made to the plurality of rules stored in the rules table.

13. The method of claim 8, wherein the compound index locates the rule of the plurality of rules in the rules table using at least one selected from the group of a best-match search and an all-matching-rows search.

14. A non-transitory computer-readable device having instructions stored thereon that, when executed by at least one computing device, cause the at least one computing device to perform operations comprising:
storing a plurality of rules in a rules table, wherein the plurality of rules relate to phases in a lifecycle of a database record, wherein the rules table is stored in a database comprising a data dictionary, wherein the data dictionary stores a plurality of variables classified by at least a category and a subcategory, and wherein the data dictionary is pre-configured with a set of variables selected from the plurality of variables based at least in part on a configuration;
querying the rules table utilizing a compound index to locate a rule of the plurality of rules in the rules table, wherein the compound index comprises at least two columns in the rules table;
receiving the located rule from the rules table based on the querying, wherein the located rule specifies a sequence of operations executable with respect to the database record;
determining a sub-sequence of operations to be executed with respect to the database record from the sequence of operations specified in the located rule; and
executing the sub-sequence of operations with respect to the database record.

15. The non-transitory computer-readable device of claim 14, wherein each operation in the sub-sequence of operations is configured to be executed after a previous operation in the sub-sequence of operations is completed.

16. The non-transitory computer-readable device of claim 14, wherein the rules table is stored in a data model configured to include at least one party, at least one governor, and at least one step.

17. The non-transitory computer-readable device of claim 14, wherein the querying the rules table utilizing the compound index further comprises:
accessing the rules table, wherein the rules table is an applicable rules table selected from a plurality of rules tables;

determining the compound index for the applicable rules table; and calculating compound index values based on the determined compound index; and querying the applicable rules table using the compound index values.

18. The non-transitory computer-readable device of claim 14, wherein the rules table is modified using previously developed code.

19. The non-transitory computer-readable device of claim 14, wherein the compound index maintains a current index of the rules table by updating the current index of the rules table when modifications are made to the plurality of rules stored in the rules table.

20. The non-transitory computer-readable device of claim 14, wherein the compound index locates the rule of the plurality of rules in the rules table using at least one selected from the group of a best-match search and an all-matching-rows search.

* * * * *